(12) United States Patent
Ohtsuka

(10) Patent No.: US 7,138,986 B2
(45) Date of Patent: Nov. 21, 2006

(54) TOUCH-TYPE INPUT APPARATUS

(75) Inventor: Kenji Ohtsuka, Tokyo (JP)

(73) Assignee: SMK Corporation, Tokyo (JP)

( * ) Notice: Subject to any disclaimer, the term of this patent is extended or adjusted under 35 U.S.C. 154(b) by 309 days.

(21) Appl. No.: 10/373,921

(22) Filed: Feb. 26, 2003

(65) Prior Publication Data

US 2003/0227446 A1    Dec. 11, 2003

(30) Foreign Application Priority Data

Jun. 10, 2002    (JP) ............................ 2002-168461

(51) Int. Cl.
*G09G 5/00* (2006.01)
*G06F 3/042* (2006.01)

(52) U.S. Cl. .................. 345/175; 178/18.09; 178/18.1; 178/18.11

(58) Field of Classification Search ................ 345/173, 345/175; 178/18.09–18; 310/328, 365
See application file for complete search history.

(56) References Cited

U.S. PATENT DOCUMENTS

| | | | |
|---|---|---|---|
| 4,567,480 A * | 1/1986 | Blanchard | 345/175 |
| 5,414,413 A * | 5/1995 | Tamaru et al. | 345/175 |
| 5,726,685 A * | 3/1998 | Kuth et al. | 345/173 |
| 6,088,068 A * | 7/2000 | Halttunen et al. | 349/12 |
| 6,414,672 B1 * | 7/2002 | Rekimoto et al. | 345/173 |
| 6,456,279 B1 * | 9/2002 | Kubo et al. | 345/173 |
| 6,677,929 B1 * | 1/2004 | Gordon et al. | 345/156 |
| 7,084,859 B1 * | 8/2006 | Pryor | 345/173 |
| 2001/0050677 A1 * | 12/2001 | Tosaya | 345/179 |

FOREIGN PATENT DOCUMENTS

| | | |
|---|---|---|
| JP | 2000-100287 | 4/2000 |
| JP | 2002-190240 | 7/2002 |
| JP | 2002-297317 | 10/2002 |

* cited by examiner

*Primary Examiner*—Henry N. Tran
(74) *Attorney, Agent, or Firm*—Darby & Darby

(57) ABSTRACT

A touch-type input apparatus which is used for operating equipment such as electric home appliances, is durable and well-designed, and prevents malfunction is disclosed. The touch-type input apparatus includes a translucent touch operation panel, touch detection means, light detection means, a light reception unit, and input determination means. The touch detection means detects a touch on the touch operation panel. The light detection means includes a light emission unit and a light reception unit. The light emission unit is provided on the rear surface side of the touch operation panel and transmits a unique light signal through the touch operation panel. The light reception unit detects a reflected unique light signal which is transmitted from the light emission unit and is reflected on a front surface side of the touch operation panel. The input determination means determines the intended input operation based on detection signals supplied from the touch detection means and the light detection means.

14 Claims, 3 Drawing Sheets

TOUCH-TYPE INPUT APPARATUS

FIELD OF THE INVENTION

The present invention relates to a touch-type input apparatus used mainly for operating equipment such as electric home appliances.

BACKGROUND OF THE INVENTION

Electric home appliances such as water heaters and washing machines are usually provided with an operation input apparatus to operate and control the appliance in an intended way. A press-type input apparatus is a typical operation input apparatus that has a structure as shown in FIG. 5.

The press-type input apparatus 1 includes a tablet sheet 5 which is formed by laminating a pair of resistor plates 2 and 3. The resistor plates 2 and 3 are separated by a slight gap and have uniform resistance layers 2a and 3a formed on the respective surfaces that face each other. This gap between the resistor plates 2 and 3 is created by dot spacers 4 or the like. The tablet sheet 5 is covered partially by a protection cover 6 made of plastic or the like, and the remaining surface of the tablet sheet 5 is exposed.

The front surface side resistance plate 2 contacts the rear surface side resistance plate 3 when a finger or the like presses a selected position on the front surface side resistance plate 2 of the tablet sheet 5. The location of the touch can be obtained after determining the electric potential of the contact point between the front surface side resistance plate 2 and the rear surface side resistance plate 3. The intended input operation is determined based on the information associated with the contact point.

The press-type input apparatus requires applying a significant amount of pressure on the tablet sheet 5. This produces wear on the front surface side resistance plate 2 which eventually becomes deformed after repeatedly pressing the tablet sheet 5. Additionally, since a finger or the like presses on the surface of the front surface side resistance plate 2, the input operation surface tends to become dirty, thereby spoiling its appearance.

For an appliance that exposes the press-type input apparatus to moisture and humidity such as a water heater or a washing machine, it is necessary to create a water-tight seal between the peripheral edge of the exposure window 6a provided on the protection cover 6 and the peripheral edge of the tablet sheet 5. However, when the peripheral edge of the exposure window 6a of the protection cover 6 overlaps a movable part of the tablet sheet, such as a part that moves when pressed, a load is imposed on the overlapped part, potentially causing the apparatus to malfunction. A sufficient boundary must be set for applying pressure, and therefore, there is a limit to reducing the size of the apparatus.

Furthermore, due to the structure of the tablet sheet 5, the surface of the exposure window 6a in the press-type input apparatus is not entirely flat. There is a step corresponding to the thickness of the inner edge of the exposure window 6a.

SUMMARY OF THE INVENTION

The present invention provides a touch-type input apparatus which is durable, is well-designed, and prevents malfunction.

A touch-type input apparatus includes a touch operation panel, touch detection means, light detection means, and input determination means. The touch detection means detects when a touch is applied to the touch operation panel. The light detection means includes a light emission unit and a light reception unit. The light emission unit is located on the rear surface side of the touch operation panel and transmits a unique light signal through the touch operation panel. This unique light signal is reflected off of the front surface side of the touch operation panel and is received by the light reception unit. The input determination means determines the intended input operation from detection signals supplied from the touch detection means and the light detection means.

Using this touch-type input apparatus, it is possible to conduct the input operation by gently touching the touch operation panel. The input operation is detected with detection signals from both of the light detection means and the touch detection means. This apparatus is durable and less subject to malfunction.

The touch detection means can include a piezoelectric element to detect minute loads on the touch operation panel resulting from the pressure of the touch of a finger or the like on the touch operation panel. Integrating a piezoelectric element into the input apparatus is inexpensive.

A translucent liquid crystal display interposed between the rear surface side of the touch operation panel and the light detection means can present a desired display through the touch operation panel.

This display makes it possible to project a description of the operation of the appliance and to display instructions for the input operation onto the touch operation panel. This display may change depending on the situation.

DETAILED DESCRIPTION OF THE PREFERRED EMBODIMENTS

Figure 1:
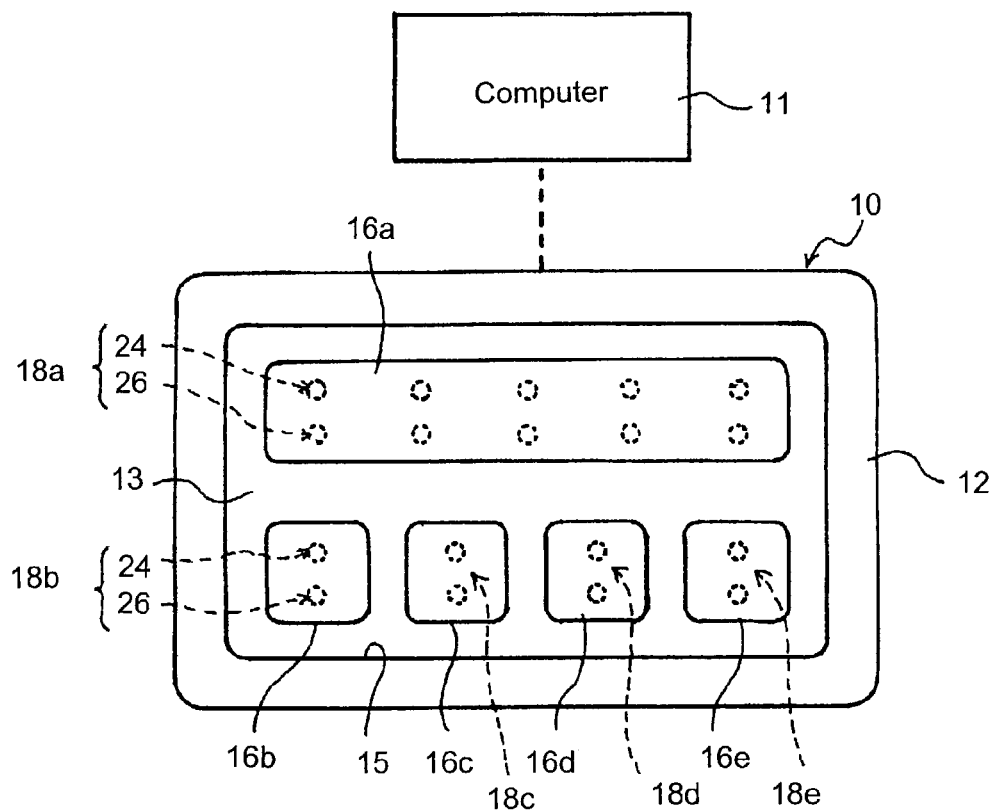
FIG. 1 is a front overview of a touch-type input apparatus according to the present invention.

FIG. 1 is an overview of a touch-type input apparatus. An operation panel 10 is mounted on a home electric appliance such as a washing machine, and a computer 11 controls the appliance. An input operation is conducted on the operation panel 10 in this touch-type input apparatus.

Figure 2:
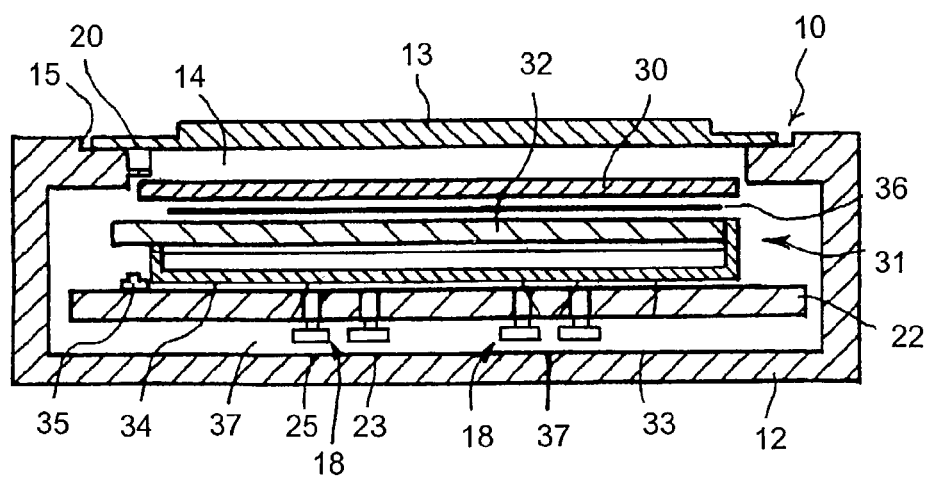
FIG. 2 is a longitudinal sectional view of an operation panel in FIG. 1.

FIGS. 1 and 2 illustrate that the operation panel 10 includes an outer shell case 12 for forming the external shape of the operation panel 10, a touch operation panel 13 for conducting an input operation from the surface, and detection means for detecting the input operation.

The outer shell case 12 is formed as a hollow box made of synthetic resin or the like and has an exposure window 14 on the front surface side. An installation recess 15 is formed on the peripheral edge of the opening of the exposure window 14. A touch operation panel 13 fits into the recess 15 and is fixed by welding or the like.

The touch operation panel 13 is formed from a translucent plate made of a material such as acrylic. Multiple operation sections 16a, 16b, etc., are partitioned and located on the front surface side of the touch operation panel 13. The location of the operation sections can be customized to any particular use or specification. Touching the touch operation panel 13 at one of these operation sections 16a, 16b, etc., conducts an input operation.

Touch detection means 17 and light detection means 18 comprise the detection means for detecting the input operation. The touch detection means 17 detects when a finger or the like contacts the touch operation panel 13. The light detection means 18 detects the location of the touch, such as the particular operation section 16a, 16b, etc., of the touch operation panel 13 where the input operation is conducted. Detecting the location of the touch is accomplished by sensors that rely on a light signal, not by the degree of pressure applied to the panel. The two signals supplied from the touch detection means 17 and the light detection means 18 are transmitted to a computer 11 which serves as input determination means for determining the intended input operation on the operation panel 10 based on the two signals.

The touch detection means 17 is located on the rear surface side of the touch operation panel 13 and sends a touch detection signal to the computer 11 when an operating body 19 such as a finger contacts the touch operation panel 13.

Figure 3:
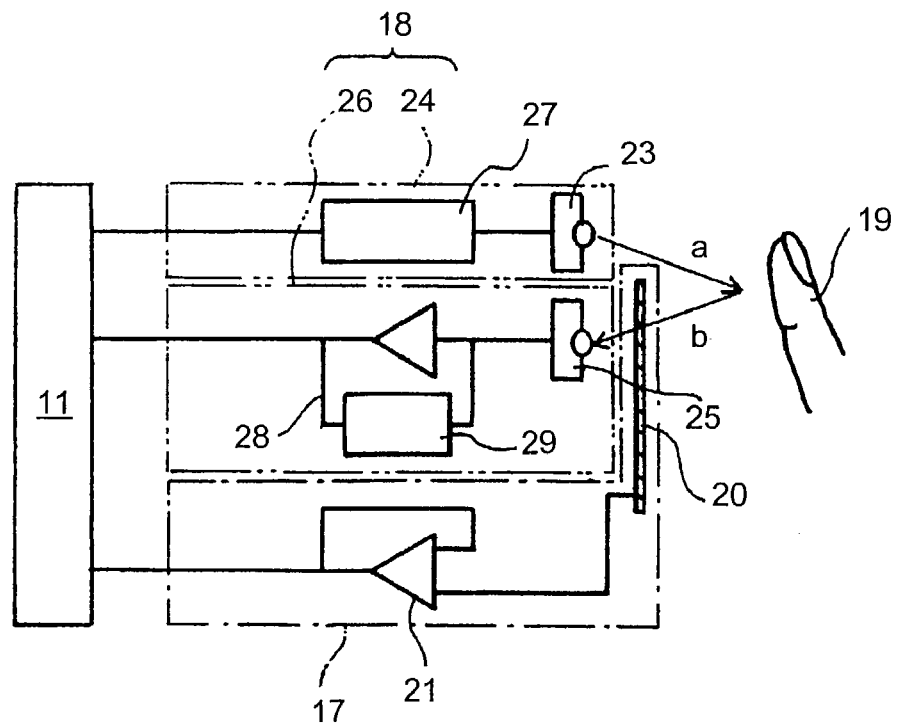
FIG. 3 is a block diagram of the touch-type input apparatus.

This touch detection means 17 may include a piezoelectric element 20, such as a piezoelectric sensor, located on the rear surface of the touch operation panel 13 as shown in FIG. 3. The piezoelectric element 20 detects minute loads generated on the touch operation panel 13 when the operation body 19 contacts the touch operation panel 13. The touch detection means 17 sends a detection signal to the computer 11 through an amplifier circuit 21.

A printed circuit board 22 is provided on the rear surface side of the touch operation panel 13 in the outer shell case 12. Light detection means 18a, 18b, etc., on the print circuit board 22 correspond to the individual operation sections 16a, 16b, etc., to detect the position of an input operation conducted on the touch operation panel 13.

The light detection means 18 includes a light emission unit 24 and a light reception unit 26. The light emission unit 24 includes a light emission element 23 which emits a light signal unique to the individual light detection means 18a, 18b, etc. The light reception unit 26 includes a light reception element 25 which receives a reflection of the unique light signal that is transmitted from the light emission unit 24 and is reflected off of the operation body 19.

The light emission unit 24 includes the light emission element 23, a light emission diode, and a driver 27. The light emission element 23 includes the light emission diode and is connected to the driver 27 as shown in FIG. 3. The driver 27 controls the light emission element 23 by supplying a drive control signal at a predetermined, unique frequency. The unique light signal, such as an infrared ray, is emitted from the light emission element 23 in the light emission unit 24 and is transmitted through the touch operation panel 13.

Figure 4:
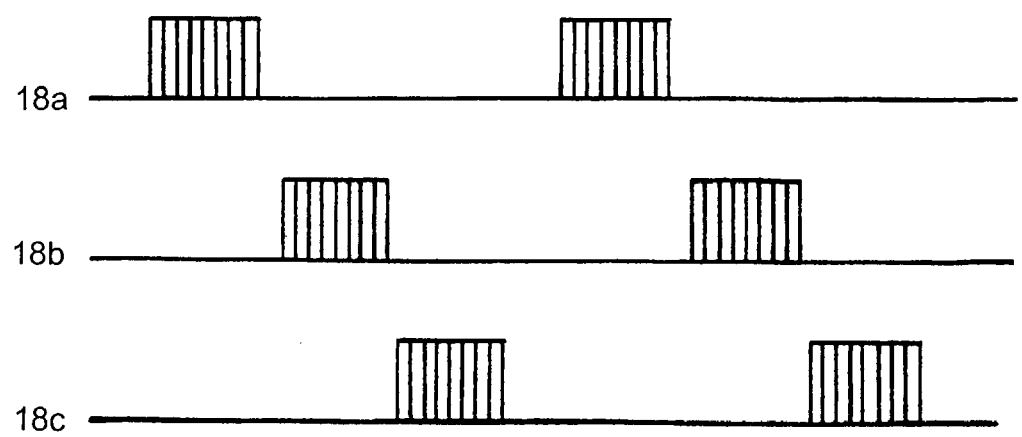
FIG. 4 is a timing chart of unique light signals emitted from light emission units.
Figure 5:
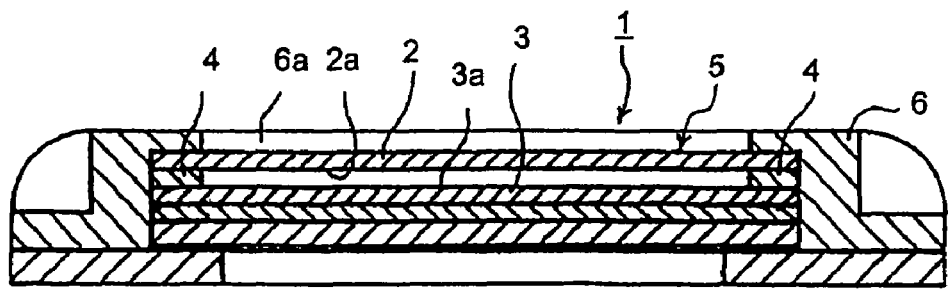
FIG. 5 is a longitudinal sectional view of a conventional press-type input apparatus.

The driver 27 is connected to the computer 11. The computer 11 prevents simultaneously supplying drive control signals from the drivers in each of the individual pairs. The unique light signals are timed to prevent overlapping when emitted from the light emission elements 23 in the light emission units 24. FIG. 4 shows an example of a timing chart for the unique light signals emitted from the light emission elements 23.

The light reception unit 26 is provided with a light reception element 25 that receives the reflected unique light signal and an amplifier circuit 28 that is connected to the light reception element 25. The light reception element 25 in the light reception unit 26 photoelectrically converts the signal to a unique frequency with the amplifier circuit 28 and transmits the photoelectrically-converted signal to the computer 11. The amplifier circuit 28 uses a low pass filter (LPF) 29 to supply the computer 11 only with the photoelectric-converted signal at the unique frequency.

The multiple light reception elements 25 are distributed on the rear surface side. When the operation sections 16a, 16b, etc., are spaced far apart, the operation body 19 can be effectively detected by any one of the light reception elements 25 when approaching the touch operation panel 13.

In the light detection means 18, a unique light signal a is emitted periodically from the light emission unit 24 through the individual operation section 16a, 16b, etc. When the operation body 19 approaches a specific operation section 16a, 16b, etc., corresponding to a specific input operation, a unique light signal a is reflected on the operation body 19 on the front surface side of the touch operation panel 13. A reflected unique light signal b is received by the light reception element 25 provided on the rear surface side of the individual operation section 16a, 16b, etc.

When the light reception unit 26 detects the reflected unique light signal b, the light reception unit 26 transmits the photoelectric-converted signal at the unique frequency to the computer 11 through the amplifier circuit 28.

Since the computer 11 can identify the unique light signals of the individual light detection means 18a, 18b, etc., the computer 11 determines the particular operation section 16a, 16b, etc., corresponding to the unique light signal it has received, thereby determining the input operation that is intended to be conducted on the touch operation panel 13.

The computer 11 serving as input determination means, receives the touch detection signal from the touch detection means 17 and the light detection signal from the light detection means 18. The computer 11 determines the intended input operation to control the equipment from these two signals.

The computer 11 determines that an input operation has been conducted only when it receives the two signals simultaneously and then supplies the equipment with the control signal.

A translucent liquid crystal display (LCD) 30 and a backlight unit 31 may be interposed between the light detection means 18 and the touch operation panel 13 in the touch-type input apparatus as shown in FIG. 2.

The liquid crystal display 30 can be placed so as to be laminated on the rear surface side of the touch operation panel 13 and can show a description of the operation through the touch operation panel 13. Therefore, the liquid crystal display 30 can show information based on controlling the equipment, and it is possible to change the content shown in the operation sections 16a, 16b, etc., depending on the mode of operation.

The output of the liquid crystal display 30 is controlled by a liquid crystal display driver which is not shown in the drawings and by the characteristics of the individual operation sections 16a, 16b, etc., such as number and size. In addition, the output can be changed according to the state of operation of the equipment.

The liquid crystal display 30 can be illuminated by backlight unit 31 laminated on the rear surface side of the liquid crystal display 30.

The backlight unit 31 includes a light guide plate 32 for a backlight, a reflective plate 33, and a support holder 34. The support holder 34 supports the light guide plate 32 for the backlight and the reflective plate 33 while they are laminated. The content displayed on the liquid crystal display 30 is illuminated from the rear surface side when the light radiates from a light source 35 for the backlight to the light guide plate 32.

The light guide plate 32 for the backlight is formed by a transparent acrylic plate. A diffusion sheet 36 is adhered on the front surface, the surface facing the liquid crystal display 30, of the light guide plate 32.

The reflective plate 33 is made from a plate material, and its surface that faces the light guide plate 32 is painted white. Since the reflective plate 33 is laminated on the rear surface of the light guide plate 32, backlight emitted from the light source 35 is guided while the light is scattered inside the light guide plate 32. Consequently, the displayed content on the liquid crystal display 30 is illuminated by the backlight and can be seen from the front side of the touch operation panel 13.

Additionally, the backlight unit 31 can change the background color or can blink the illumination. It is possible to provide multiple backlight units 31 for the individual operation sections 16a, 16b, etc., and to partition the individual backlight units by using partition plates. Partitioning permits changing the illumination for each of the individual backlight units 31 for the individual operation sections 16a, 16b, etc.

Light guide holes 37 are bored through the reflective plate 33, the support holder 34, and the print circuit board 22 at positions corresponding to the locations of the light emission elements 23 and the light reception elements 25 of the individual light detection means 18. With this construction, the light emission element 23 can emit the unique light signal properly, and the light reception element 25 can receive the reflected unique light signal properly.

The computer 11 serving as the input determination means is provided independently from the operation panel 10. However, the operation panel 10 can have an internal integrated input determination unit.

Since the touch-type input apparatus determines the intended input operation based on the combination of detection signals from the touch detection means and the light detection means, only a gentle touch is required to initiate an input operation. Therefore, the touch-type input apparatus is durable. Additionally, since the touch detection means must be transmitted simultaneously with the light detection means, the touch-type input apparatus eliminates errors caused in situations such as when an insect sets off the light detection means. Furthermore, since the individual parts have a laminated structure, the surface is substantially flat even after applying waterproof treatment. This input apparatus has few design restrictions and can be used in humid places such as bathrooms and in other public places.

Since a piezoelectric element 20 is used for the touch detection means, it is possible to sense very small loads on the touch operation panel caused by the pressure of a finger or the like when it contacts the touch operation panel 13. The piezoelectric element 20 is inexpensive and can be easily integrated.

The translucent liquid crystal display which shows the desired display through the touch operation panel is interposed between the touch operation panel and the light detection means. Therefore, it is possible to project a display describing the operation of the equipment or assisting the input operation on the touch operation panel. The display can be changed depending on the situation.

What is claimed is:

1. A touch-type input apparatus comprising:
   a touch operation panel;
   a touch detection unit operable to detect a load on said touch operation panel, said touch detection unit comprising a piezoelectric element;
   a light detection unit comprising:
      a light emission unit operable to transmit a unique frequency light signal through said touch operation panel, said light emission unit provided on a rear surface side of said touch operation panel; and
      a light reception unit operable to detect said unique frequency light signal transmitted from said light emission unit and subsequently reflected on a front surface side of said touch operation panel; and
   an input determination unit operable to perform an input operation determination from detection signals supplied from said touch detection unit and said light detection unit.

2. The touch-type input apparatus as set forth in claim 1, wherein the input determination unit determines an input operation only when the input determination unit simultaneously receives the detection signal supplied by the touch detection unit and the detection signal by the light detection unit.

3. The touch-type input apparatus according to claim 1, further comprising a translucent liquid crystal display interposed between the rear surface side of said touch operation panel and said light detection unit.

4. The touch-type input apparatus as set forth in claim 1, wherein the input determination unit is further operable to determine the location of an input based upon the detection signal supplied by the light detection unit.

5. A touch-type input apparatus comprising:
   a touch operation panel;
   a touch detection unit operable to detect a load on the touch operation panel;
   a light detection unit comprising:
      a plurality of light emission units, each light emission unit operable to transmit a respective unique light signal through the touch operation panel; and
      a plurality of light reception units, each light reception unit operable to detect the respective unique light signal reflected off an operation body; and
   an input determination unit operable to determine an input operation only when the input determination unit simultaneously receives a load detection signal from the touch detection unit and an input detection signal from a respective light detection unit.

6. The touch-type input apparatus as set forth in claim 5, wherein the touch detection unit comprises a piezoelectric element.

7. The touch-type input apparatus as set forth in claim 5, further comprising a translucent liquid crystal display interposed between a rear surface side of said touch operation panel and said light detection unit.

8. The touch-type input apparatus as set forth in claim 5, wherein the input determination unit is further operable to determine the location of an input based upon the input detection signal transmitted by the light detection unit.

9. A touch-type input apparatus comprising:
   a touch operation panel;
   a touch detection unit operable to detect a load on the touch operation panel and further operable to transmit a load detection signal;
   a plurality of light detection units operable to transmit an input detection signal, each light detection unit comprising:

a respective light emission unit operable to transmit a respective unique light signal through said touch operation panel; and a respective light reception unit operable to detect the respective unique light signal reflected off an operation body; and an input determination unit operable to determine an input operation only when the input determination unit simultaneously receives the load detection signal from the touch detection unit and the input detection signal from a respective light detection unit.

10. The touch-type input apparatus as set forth in claim 9, wherein each light emission unit is operable to transmit a respective unique light signal having a unique frequency.

11. The touch-type input apparatus as set forth in claim 9, further comprising a translucent liquid crystal display interposed between a rear surface side of said touch operation panel and the plurality of light detection units.

12. The touch-type input apparatus as set forth in claim 9, wherein the input determination unit is further operable to determine the location of an input based upon the input detection signal transmitted from the respective light detection unit.

13. The touch-type input apparatus as set forth in claim 9, wherein the touch detection unit comprises a piezoelectric element.

14. The touch-type input apparatus as set forth in claim 5, wherein each of the plurality of light emission units is operable to transmit a respective unique light signal having a unique frequency.

* * * * *